(12) United States Patent (10) Patent No.: US 8,243,742 B2
Forsberg et al. (45) Date of Patent: Aug. 14, 2012

(54) SYSTEM AND METHOD FOR ENFORCEMENT OF SERVICE LEVEL AGREEMENTS AND POLICIES ACROSS GEOGRAPHICAL DOMAINS

(75) Inventors: Anders Lars-Goran Forsberg, San Francisco, CA (US); Prasad Peddada, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/202,622

(22) Filed: Sep. 2, 2008

(65) Prior Publication Data

US 2009/0225763 A1 Sep. 10, 2009

Related U.S. Application Data

(60) Provisional application No. 61/034,008, filed on Mar. 5, 2008.

(51) Int. Cl.
*H04L 12/56* (2006.01)
(52) U.S. Cl. ......... 370/401; 370/328; 709/218; 709/224
(58) Field of Classification Search .................. 370/254, 370/328, 350, 400, 401, 408, 422; 709/217–219, 709/224
See application file for complete search history.

(56) References Cited

U.S. PATENT DOCUMENTS

| 6,988,133 | B1 | 1/2006 | Zavalkovsky et al. |
| 7,254,645 | B2 | 8/2007 | Nishi |
| 7,299,265 | B2 * | 11/2007 | Chatterjee et al. ............ 709/208 |
| 2002/0126686 | A1 * | 9/2002 | McKinnon et al. ............ 370/442 |
| 2004/0019560 | A1 * | 1/2004 | Evans et al. .................... 705/40 |
| 2007/0127391 | A1 * | 6/2007 | Goodman ...................... 370/252 |
| 2007/0189293 | A1 | 8/2007 | Yamada et al. |
| 2008/0008090 | A1 | 1/2008 | Gilfix |
| 2008/0240150 | A1 * | 10/2008 | Dias et al. ...................... 370/465 |

FOREIGN PATENT DOCUMENTS

| EP | 1 598 982 | 11/2005 |
| WO | 0206973 | 1/2002 |

OTHER PUBLICATIONS

SLA Enforcement mediation primitives downloaded from http://publib.boulder.ibm.com/infocenter/wtelecom/v6r2m0/index.jsp?topic=/com.ibm.twss.primitives.doc/sla_r.html on Oct. 29, 2008, 3 pages.
Guaranteed service level agreements across multiple ISP networks (Abstract), downloaded from http://ieeexplore.ieee.org/Xplore/login.jsp?url=/iel5/8992/28534/01275373.pdf?arnumber=1275373 on Oct. 29, 2008, 1 page.
Enforcing Resource Sharing Agreements among Distributed Server Clusters (Abstract), downloaded from http://portal.acm.org/citation.cfm?id=876874.878682&coll=&dl=, on Nov. 6, 2008, 1 page.

* cited by examiner

*Primary Examiner* — Ayaz Sheikh
*Assistant Examiner* — Mounir Moutaouakil
(74) *Attorney, Agent, or Firm* — Fliesler Meyer LLP

(57) ABSTRACT

A service access gateway is described that provides enforcement of service level agreements across geographically remote domains. Each domain can comprise an access tier and a network tier that can be scaled by adding or removing server nodes. At the network tier level, a master node can be selected in each domain in order to maintain budget state information for the domain. Additionally, a global master can be elected in order to maintain the state information across multiple domains such that the service level agreements can be enforced in a synchronized manner. A geographical configuration service can also be implemented to generate alarms in cases where service level agreements across the multiple sites are not identical.

19 Claims, 5 Drawing Sheets

SYSTEM AND METHOD FOR ENFORCEMENT OF SERVICE LEVEL AGREEMENTS AND POLICIES ACROSS GEOGRAPHICAL DOMAINS

CLAIM OF PRIORITY

The present application claims the benefit of U.S. Provisional Patent Application No. 61/034,008 entitled SYSTEM AND METHOD FOR ENFORCEMENT OF SERVICE LEVEL AGREEMENTS AND POLICIES ACROSS GEOGRAPHICAL DOMAINS, filed on Mar. 5, 2008, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and enforcement of service level agreements (SLAs) and more particularly to a method for enforcing SLAs across geographically separate domains.

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

Conventionally, telecommunications and network infrastructure providers have relied on often decades-old switching technology to providing routing for network traffic. Businesses and consumers, however, are driving industry transformation by demanding new converged voice, data and video services. The ability to meet these demands can often be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

Delivering these more sophisticated data services has proved to be more difficult than first imagined. Existing IT and network infrastructures, closed proprietary network-based switching fabrics and the like have proved to be too complex and too rigid to allow the creation and deployment of new service offerings.

While the worlds of TCP/IP applications and of telephony networks continue to converge, the relationship between them has often been overly complex and difficult to manage for various organizations, as well as for consumers. In recent times, specialized telecommunication servers and various gateway applications have emerged to enable simpler ways for developers to include telephony-based functionality in their software applications, as well as provide increased security and stability. Nevertheless, these specialized solutions continue to need improvements in performance generally required by network operators and demanded by their subscribers. One such area for improvement is the enforcement of various service level agreements by telecom providers.

DETAILED DESCRIPTION

Figure 1:
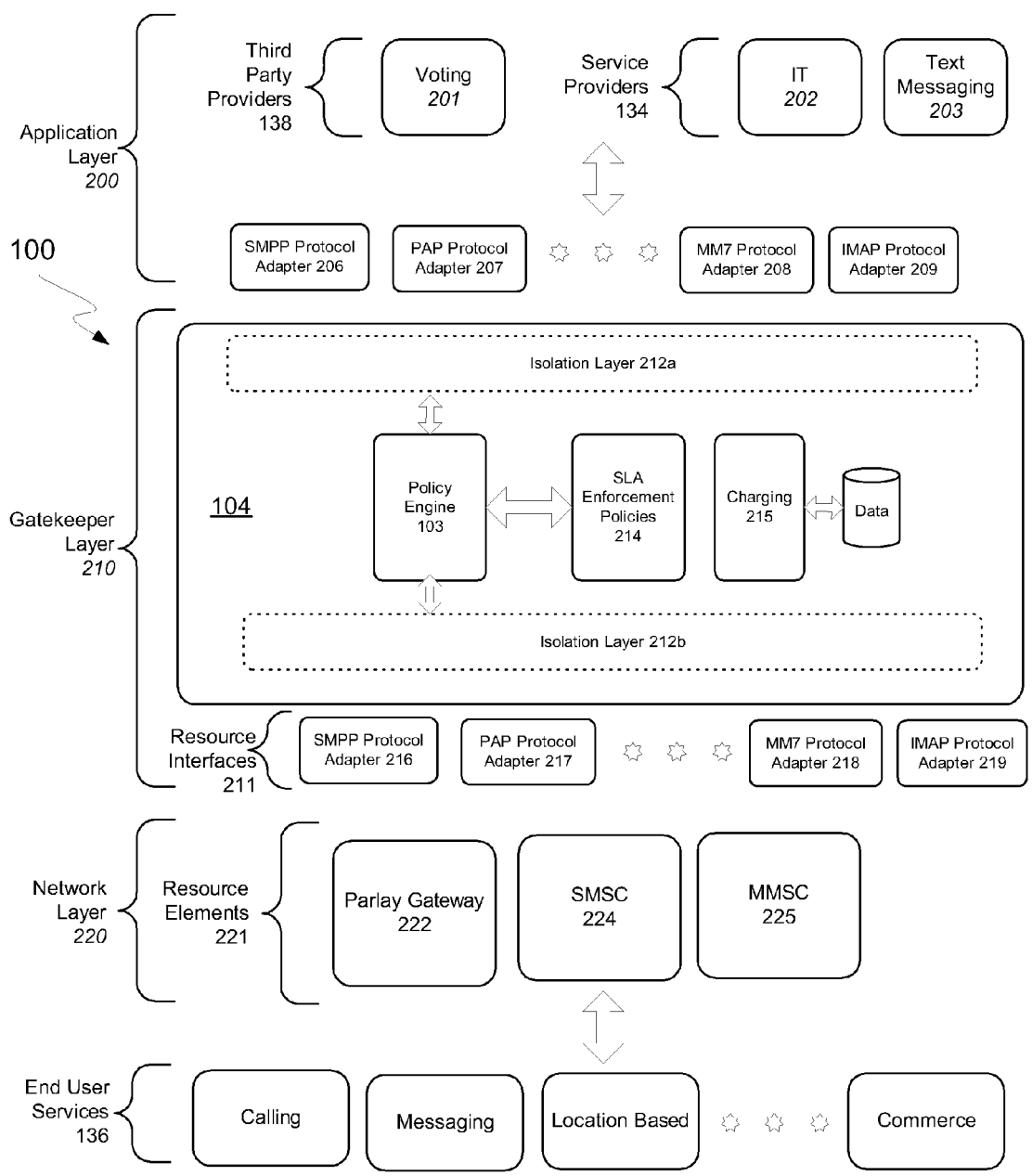
FIG. 1 is a high level illustration of a network gatekeeper application that can be used in conjunction with geographical SLA enforcement, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, there are provided mechanisms and methods for enforcement of service level agreements (SLAs) across geographically distant domains within the context of an IP multimedia system (IMS) Service Delivery Platform (SDP) and service access gateway. In this context, SLA enforcement can be synchronized across several geographically remote sites. Each site can be configured to point to its peer and a subset of the SLAs for the site can be designated as being geographically enforced. As such, this subset of the SLAs can be enforced across the two (or more) sites. In one embodiment, each geographically remote site maintains a designated hub node (cluster master) that is responsible for accounting and enforcement of the SLAs for that particular site. Enforcement across multiple sites is then accomplished through hub-to-hub synchronization of the internal state information such as global usage counts. In one embodiment, the accuracy of enforcement across site pairs is configurable through a synchronization interval.

The term geographic enforcement, as used in this disclosure, is intended to mean enforcement across two or more domains or deployments which are deployed at different geographic sites and remotely located with respect to one another. In one embodiment, the second cluster can be a separate deployment which is external to the local area network (LAN) connection of the first cluster.

As an illustration a telecom provider may have an East Coast domain cluster that handles telecommunications from clients and subscribers in the East Coast and a separate West Coast deployment for its West Coast clientele. These two network deployments would be geographically remote with respect to each other, which can provide several advantages. One such advantage is that in cases of severe disasters, such as earthquakes or massive power outages near one domain, the other domain can continue to process requests and clients may failover to this other domain. Another advantage is that by geographically separating the deployments, various clients can be located physically closer to the servers handling their requests, which can in turn reduce latency and improve performance. In this manner, load can be distributed across sites to achieve high availability and scalability. Accordingly, when deployment is geographically separated in such a way, it becomes useful and advantageous for a telecommunications provider to manage and enforce service level agreements across all deployments in a synchronized and uniform manner.

In various embodiments, the geographical SLA enforcement features described herein can be implemented in a network gatekeeper application built on top of a JAVA 2 Enterprise Edition (J2EE) compliant application server. The network gatekeeper can provide a policy driven telecommunications web services gateway that allows granular control over access to network resources from un-trusted domains. In one embodiment, the network gatekeeper is a service access gateway deployed by a telecom provider in order to manage access to its network by the third party services that are offered to the various subscribers of the telecom provider.

As an illustration, most operators and telecommunication providers expect to drastically increase the portfolio of services offered to their customers to hundreds and even thousands of content and application offerings. While some of these services may be developed in-house (and thus be deployed on an internal network), the vast majority of such services will likely come from third party service providers and partners. This creates a need to handle the network and application integration with such third party services, as well as manage the entire ecosystem to the satisfaction of the consumers. The network gatekeeper application can provide a secure common entry point for third party applications accessing network resources both through telecom web services interfaces and through policy-based, secure and extensible network interfaces. In one embodiment, the network gatekeeper can include a service level agreement (SLA) based policy enforcement engine, which can enforce third-party partner SLA policies at runtime. It can also enable network operators to dynamically customize partner SLA data and access rules to fit traffic prioritization models and the capacity of each individual network node.

Additionally, the network gatekeeper can provide rich traffic management and shaping features. This can allow operators to create deterministic traffic management solutions, distribute traffic internally throughout the network and increase the availability and reliability of services.

The gateway can be deployed on the telecom operator network in multiple tiers of deployment—a stateless access tier and a stateful network tier. In one embodiment, the two tiers implement a firewall in between them for greater security. The stateless access tier can serve as an entry point for (possibly un-trusted) third party applications into the network. The network tier which integrates with the internal network can be shielded from the applications by the access tier.

In various embodiments, the geographic SLA enforcement can be implemented within the network tier of deployment. Once a request is received to the gateway from a client application, a singleton budget service can be invoked by an entity handling the request, such as a plug-in manager. The budget service is a service designed to simplify the enforcement of service level agreements (SLAs) in the network cluster. In one embodiment, the SLA enforcement is based on a budget. The budget reflects the current request rate based on traffic history. In one embodiment, the budget is created based on the parameters configured in the SLAs when these are provisioned. Each node in the cluster updates the local traffic count and updates the cluster wide count maintained by one selected node (cluster master or hub) based on load and/or regular intervals. The cluster master is a singleton service that is highly available and can be guaranteed to be available by the application server infrastructure. This can be implemented by having only one running instance of the budget service on the network at any given time. This singleton service is also guaranteed to be active on only one application server in the cluster, which makes it possible to implement a solution that enforces SLA accurately. Budget values which span longer periods of times (e.g. days) can be persisted in the persistent store to minimize the state loss in the event of failure of the cluster master.

In one embodiment, two or more geographically distant sites of the gateway deployment are maintained. Each site is comprised of an access tier and a network tier, as previously described. A hub node is designated in each site at the network tier level. In other words, one network tier server is selected to be a master hub which will enforce SLAs for that particular site. In one embodiment, when there are SLAs that need to be enforced across multiple geographical sites, one of those master hub nodes is elected to be a global master. This global master is responsible for enforcing SLAs across both domains and it will maintain the budget state information for both domains. For example, periodically the slave servers can update the budget state on each hub. The local hubs can then update the state on the global master, wherever it may be. In this manner, the budget state can be synchronized across both domains. In alternative embodiments, the budget state information can be replicated between the master hubs, without requiring one node to become the global master.

The synchronization of budget state can occur upon expiration of a time interval. In one embodiment, the system automatically determines the optimal synchronization interval based on the requirements of the application, service provider or the network. In alternative embodiments, the synchronization interval can be configurable by a system administrator in order to manually optimize performance across the sites.

The categories of data which are candidates to be distributed or replicated to other sites (depending on the restrictions on application load balancing and failover between sites) are SLA quota counters and SLA request limits. In one embodiment, geographic redundancy design does not maintain state for ongoing conversations. Conversations in this sense are defined in terms of the correlation identifiers that are returned to the applications by network gatekeeper or passed into network gatekeeper from the applications. In this embodiment, any state associated with a correlation identifier exists on only a single geographic site and may be lost in the event of a site-wide disaster. Conversational state can include, but is not limited to, call state and registration for network triggered notifications. This type of state is considered volatile, or transient, and in certain embodiments is not replicated at the site level. In alternative embodiments, however, this volatile conversation state can also be replicated across the multiple sites.

In some cases, it can be advantageous to persist some of the long-lived budget state into a database or some other form of persistent storage. For example, budget state that is maintained for hours or even days may be considered long lived and can be persisted into a database on one domain. In that case, if the SLAs are geographically enforced, the global master should also ensure that the budget state is also persisted in the other domain in order to keep track of accurate state information across both sites. This can be performed by the global master transmitting instructions to the local master to persist the appropriate information into the database.

In one embodiment, the provisioning of SLAs and other configuration is performed manually at each site. Because of this, a geographical configuration (geo-config) service can be implemented. The geo-config service can verify that the budget configuration information defined in SLAs are identical across both domains and generate alarms if any discrepancies are found. In many cases, if differing SLA configurations are attempted to be uniformly enforced across two domains, various errors may occur. In order to prevent such errors, the system can automatically generate alarms whenever the SLAs configured in the two or more domains are not identical. Thus, alarms would be generated if a site does not have identical service provider group and application group level SLA configuration between peer sites. In alternative embodiments, the system can automatically provision the SLAs transparently across all of the multiple domains, removing the need to check for discrepancies.

In addition, in order to reduce the likelihood of errors, alarms can be generated if site A treats site B as a peer, but site B does not recognize site A as a peer. Similarly, if any SLAs contain overrides, an appropriate alarm may be generated.

In various embodiments, the SLA can be implemented as an extensible markup language (XML) file. The SLA format can support contracts to be enforced across geographic site domains. Accordingly, when the SLAs are being defined, the user has the option to configure to system to enforce the SLAs across multiple geographical domains. This can be configured at the application SLA or at the service provider SLA.

Thus, for those applications and service provider configurations that need SLA enforcement across sites, the system can replicate internal state to all the sites in order to enforce request and quota limits, as defined in the SLA file. In one embodiment, the system also supports adding new sites in order to support increased load and also removal of sites for maintenance purposes. SLA can be enforced across all of the active sites. Alternatively, SLA enforcement can be configured across a subset of the active sites.

The various embodiments are illustrated in conjunction with the figures described below. It should be noted, however, that the components illustrated in the figures are not intended to limit the scope these embodiments and are provided purely for purposes of illustration and explanation.

FIG. 1 is a high level illustration of a network gatekeeper application that can be used in conjunction with geographical SLA enforcement, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The network gatekeeper 104 provides a policy-driven telecommunications Web services gateway that allows granular control over access to network resources from un-trusted domains. This gateway application can be deployed by a telecom provider in order to manage access to its internal network and its subscribers by external third party service provider applications.

As illustrated by way of example, an embodiment of a network gatekeeper layer 210 provides an easy to use, integrated, configuration-driven intermediary between service providers 134, third party service providers 138 and end users 136. The communications platform of a typical telecom organization can comprise an application layer 200 with interfaces to applications of the service providers 134 and third party service providers 138 and a network layer 220 to interface with the end users 136 via one or more network resource elements 221. The communications platform can further comprise a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages a service provider sends per hour, and if over a contract limit, the service provider may start paying additional licensing to the telecom provider. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 1, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem), an SMSCs (short-message-service-center) 224 and MMSCs (multi-media messaging service center) 225, each of which provides a mechanism for moving information through the network to one or more end user services 136.

Tools for interacting with Web Services, such as a Web Service—Universal Description Discovery Interface (WS/UDDI), a Web Service—Business Process Execution Language (WS/BPEL) may also be coupled to the network gatekeeper 104 in various embodiments. A log/trace and database can assist with troubleshooting. In some deployments, the network gatekeeper can interface with processes that monitor underlying network function, such as Operations Support Systems/Business Support Systems (OSS/BSS) system via RA protocol adapters. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections, customer management, including order entry, customer self services, customer care, trouble ticketing, and customer relationship management. Such interfaces can provide access to Operation, Administration, and Maintenance (OAM) applications and others. A policy engine can control access by one or more third party services and services to resource elements in a network layer.

Figure 2:
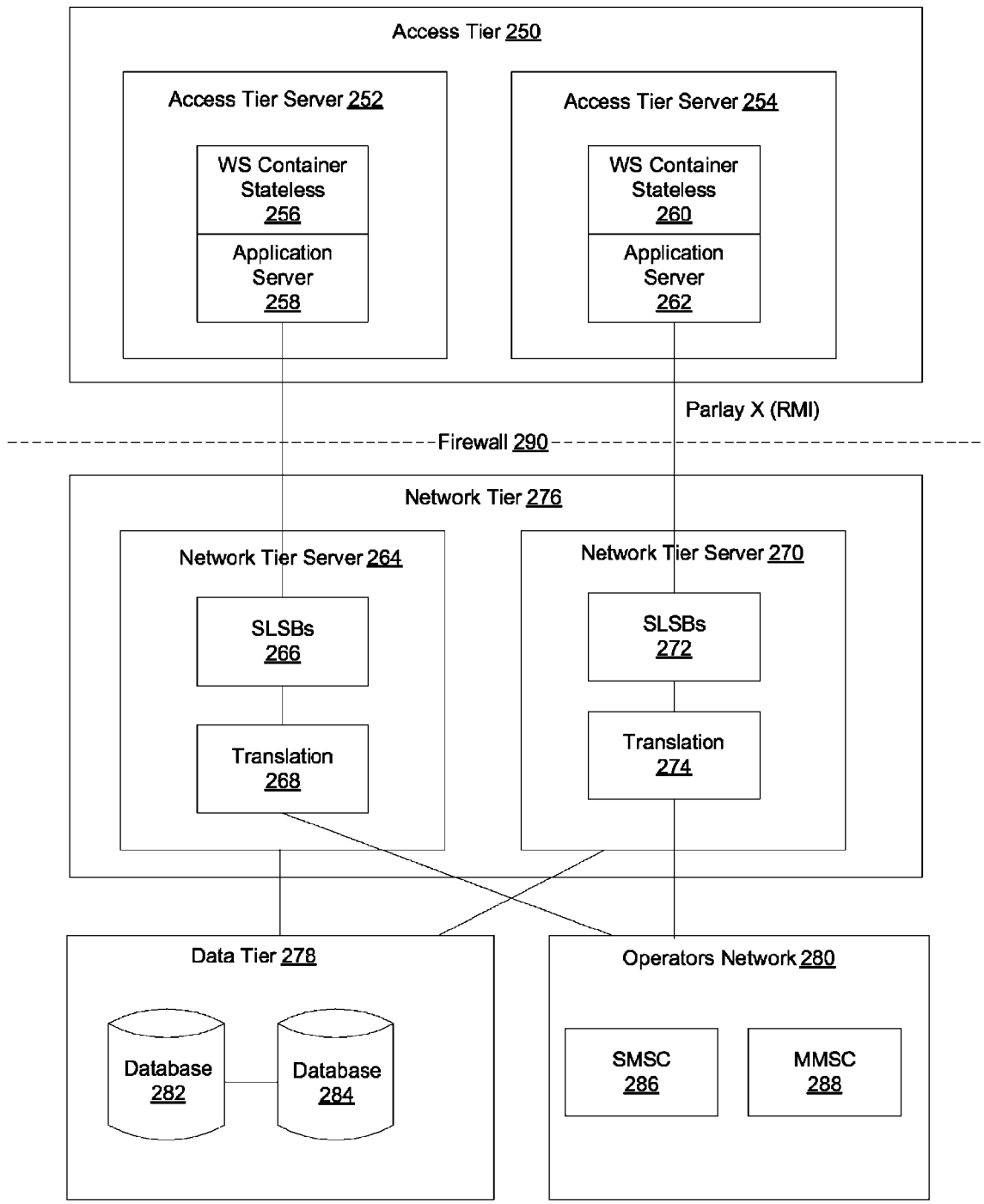
FIG. 2 is an illustration of the network gatekeeper deployment within a telecommunications network, in accordance with various embodiments.

FIG. 2 is an illustration of the network gatekeeper deployment within a telecommunications network, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network gatekeeper can be deployed in two tiers—an access layer cluster and a network layer cluster having a firewall 290 in between. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described.

Each tier can be scaled individually by adding new servers. In one embodiment, each server in each tier is running in an active mode.

The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 288, which can then forward the message to the recipient. In various embodiments, the main duties of the SMSC and the MMSC are to route various messages and to regulate the process.

Figure 3:
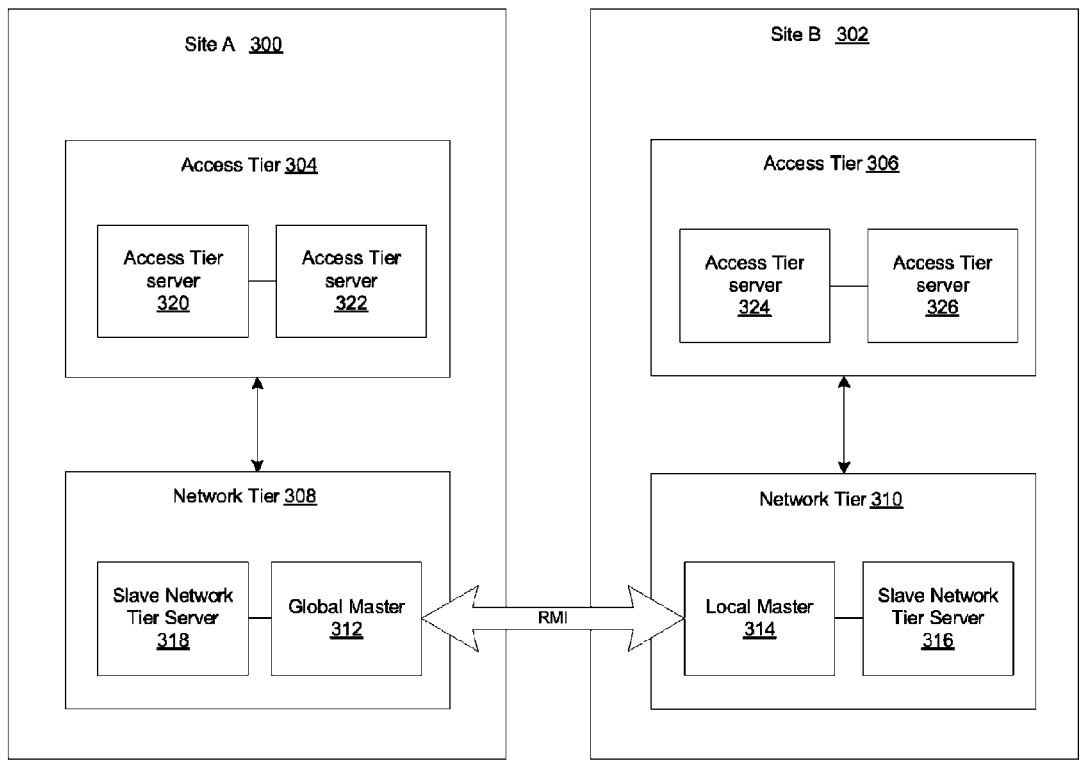
FIG. 3 is an illustration of two geographically remote domains configured with enforcement of SLAs, in accordance with various embodiments.

FIG. 3 is an illustration of two geographically remote domains configured with enforcement of SLAs, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, two service access gateway sites can be deployed by a telecommunications provider. Site A 300 can be geographically remote with respect to Site B 302. Each deployment site can include an access tier 304, 306 and the network tier 308, 310, as previously described. The access tier can be comprised of multiple access tier servers 320, 322, 324, 326 and the network tier can similarly be scaled to include a plurality of nodes.

The network tier within each domain can include a local master 314 as well as one or more other slave servers 316. In one embodiment, one of the local masters of the two domains 300, 302 can be elected to be the global master 312. This global master can be elected by using various techniques. For example, the first server to boot can assume the role of being the global master across both domains. If multiple servers boot simultaneously, a handshaking mechanism can be used to automatically select one of the network servers to be the global master 312.

Once elected, the global master 312 can be responsible for enforcing service level agreements (SLAs) across both domains in a uniform manner. This can be done by stretching budget state information across both domains. In one embodiment, the local master and the global master can synchronize budget state information by using synchronous and/or asynchronous remote method invocation (RMI) calls. The budget state that is synchronized can include SLA quota counters and SLA request limits.

Additionally, the deployments can include various other components which have been left out of this illustration for purposes of clarity and simplicity. For example, the deployments can include global/local load balancers, databases or other forms of persistent storage and various other network elements.

Figure 4:
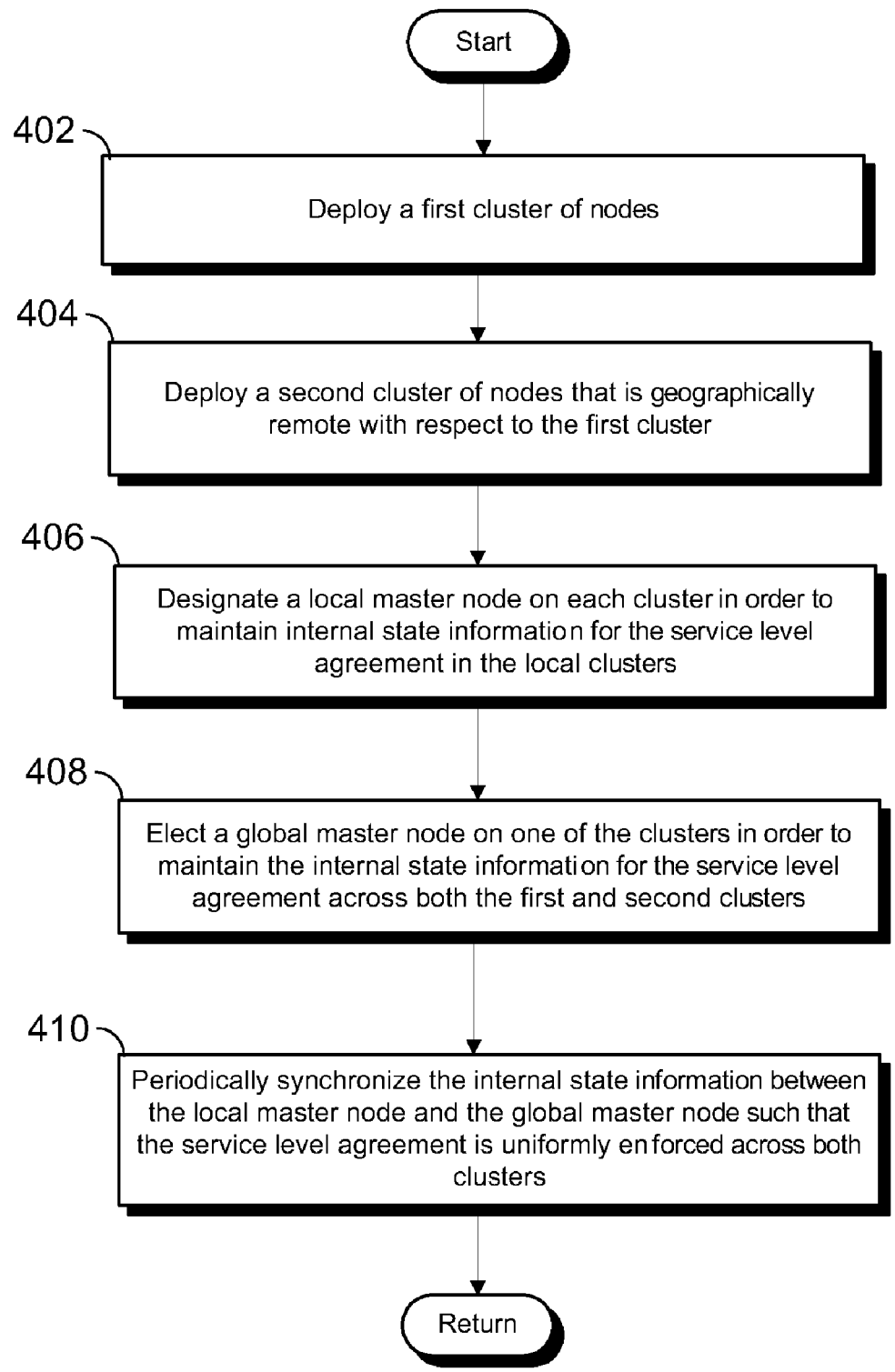
FIG. 4 is an exemplary flow chart diagram of the high level process for geographical SLA enforcement, in accordance with various embodiments.

FIG. 4 is an exemplary flow chart diagram of the high level process for geographical SLA enforcement, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 402, a first cluster of nodes can be deployed by a telecom provider. In step 404 a second cluster of nodes is deployed, one that is geographically remote with respect to the first cluster. Each of these clusters can represent a separate deployment of the service access gateway. In step 406, a local master node is designated in each cluster. This local master will be responsible for maintaining the internal state information for the SLAs in the local clusters.

In step 408, a global master is elected on one of the clusters. The global master will be responsible for maintaining the state information across both first and second cluster. As shown in step 410, the state can be periodically synchronized between the local master of the first cluster and the global master. This enables the SLA to be uniformly enforced across both clusters and both deployments.

Figure 5:
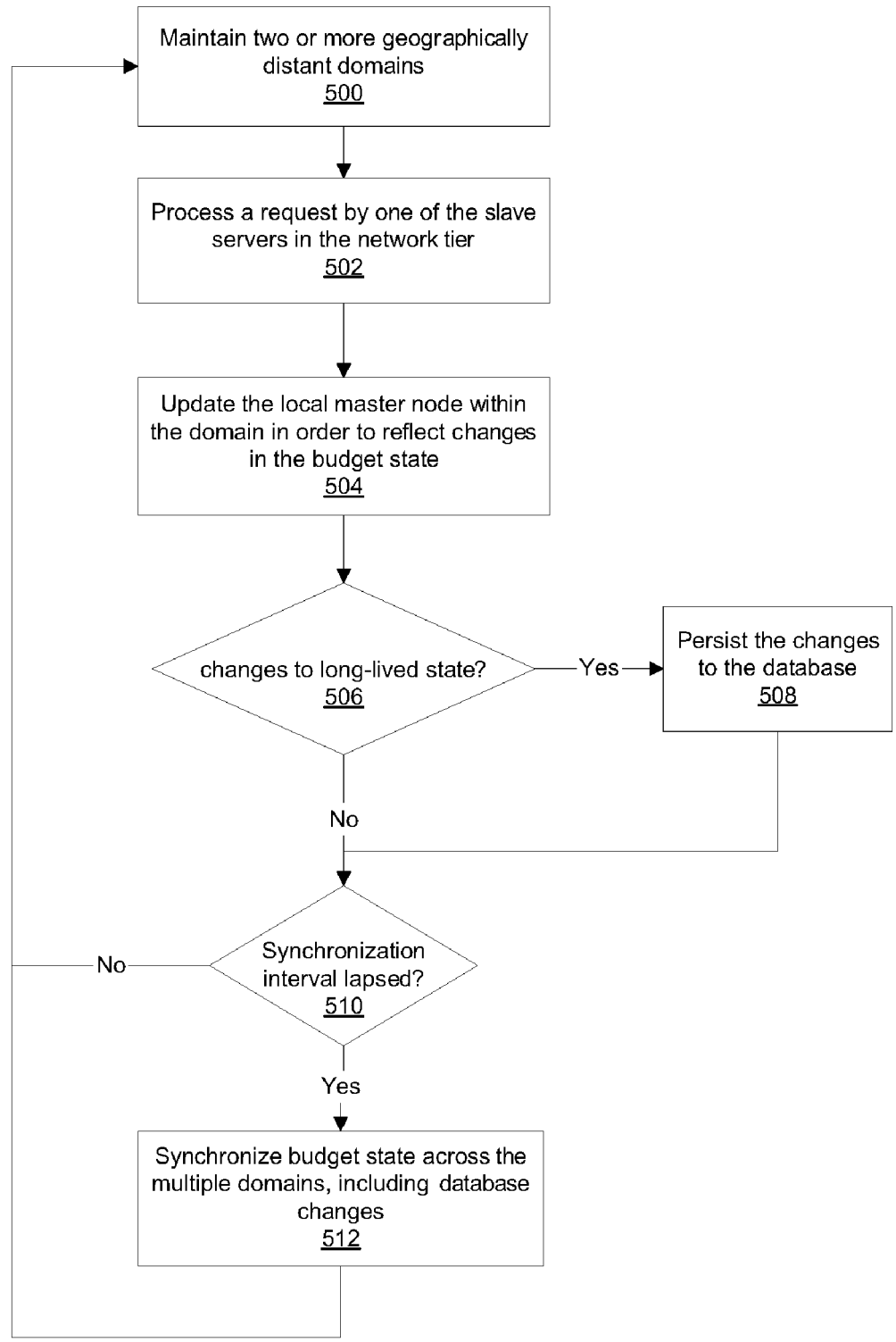
FIG. 5 is an exemplary logical flow chart diagram of the process in accordance with various embodiments.

FIG. 5 is an exemplary logical flow chart diagram of the process in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 500, two or more geographically distant domains are maintained. Various requests can be processed by the network tier servers in each domain. For example, a slave server in the network tier can process an incoming request from a third party client application, as illustrated in step 502. Once the request is handled, the local master for that particular geographic site should be updated (step 504) in order to reflect any changes that have occurred to the budget state. It should be noted that the updates need not happen for every request, but rather can be performed periodically or as needed.

If there have been changes to the long-lived budget state (step 506), then these changes can be persisted in the database, as shown in step 508. For example, SLA quotas that span over several hours or days can be persisted in the database in order to avoid losing state information during server or site failures. Similarly, SLA request limits that span over longer period of time can be persisted and the characteristics are the same as that of the quota counters.

Continuing with the illustration, upon expiration of the synchronization interval (step 510), the budget state can be synchronized across the multiple domains, as shown in step 512. If any changes have been made to the database, those changes should also be updated on the other sites so as to maintain consistent state. In one embodiment, the synchronization of state is done by RMI calls between the master hubs of each domain.

In other aspects, the embodiments previously described encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, virtual machines and user applications.

Included in the programming (software) of the general/specialized computer or microprocessor are software modules for implementing the teachings of the present invention, including, but not limited to providing mechanisms and methods for geographical enforcement of service level agreements, as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:
  Basic features. These include standards services such as Voice mail, Caller ID, Call waiting, and call forwarding (the ability to forward a call to a different number).
  Advanced features. The list of advanced features is operators specific. Following is a brief list of advanced features:
  Call logs: The ability to view calls made over a given period of time online, ability to associate names with phone numbers, integrate call log information to other applications such as IM.
  Do not disturb: The ability to specify policies around receiving calls—for example, all calls during office hours to be automatically forwarded to a mobile terminal, all calls during the night to be directed to voice mail etc.
  Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.
  Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.
  Lifetime number: This is the facility where a single virtual number can travel with a customer wherever they live. Even if they move, the old number continues to work, and reaches them at their new location. This is really the analog of static IP addresses in a phone network.
  Speed dial: This is the ability to dramatically expand the list of numbers that can be dialed through short-key and accelerator combinations. This is another example of a converged application, since it's very likely that when a user will sets this information when they work through the call logs on the operator user portal, the updated information will need to be propagated to the network side in real-time.

Media delivery services, including, without limitation the following features:
  Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:
  A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:
  This class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

As previously described herein, the term service level agreement (SLA) is an agreement concerning a measurable level of service between a service provider and a service consumer. The SLA can include or define a number of items, including but not limited to bandwidth, request processing, delay and other parameters. In one embodiment, an SLA is implemented as one or more extensible markup language (XML) files. In various embodiments, the terms service and web service are used interchangeably and are intended to be broadly construed to include any application, program or process resident on one or more computing devices capable of providing services to a requester or other recipient, including without limitation, network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action to shape traffic.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A system for providing enforcement of service level agreements across geographical domains, said system comprising:
   a first domain cluster of computer nodes, said first domain cluster having a first master hub node that enforces at least one service level agreement across the first domain cluster; and
   a second domain cluster of computer nodes, said second domain cluster being geographically remote with respect to the first domain cluster, said second domain cluster including a second master hub node that enforces the service level agreement across the second domain cluster;
   wherein each of said first domain cluster and said second domain cluster further includes
      a stateless access layer cluster, comprising a plurality of access tier servers, that receives and forwards requests,
      a stateful network layer cluster, comprising a plurality of network tier servers, that receives the requests from the access tier, wherein the internal state information is synchronized between the network tiers of said first cluster and said second cluster, and
      a firewall separating the stateless access layer cluster from the stateful network layer cluster;
   wherein upon processing requests, each computer node in the first domain cluster and in the second domain cluster updates a local traffic count that is based on a number of said requests processed; and
   wherein, upon expiration of a time interval, the first master hub node updates a cluster-wide traffic count for the first domain cluster and the second master hub node updates the cluster-wide traffic count for the second domain cluster; and
   wherein one of said first master hub node and the second master hub node is elected to be a global master that maintains budget state information synchronized between both the first domain cluster and the second domain cluster, and wherein the global master uniformly enforces the service level agreement across both the first domain cluster and the second domain cluster according to both the cluster-wide traffic count in the first domain cluster and the cluster-wide traffic count in the second domain cluster.

2. The system of claim 1 wherein the global master maintains state information across both the first cluster and the second cluster.

3. The system of claim 1 wherein the service level agreement is enforced in the first cluster and the second cluster by a singleton budget service.

4. The system of claim 1 wherein enforcing the service level agreement further includes:
   transmitting service level agreement quota counters and service level agreement request limits between the first master hub node and the second master hub node.

5. The system of claim 1, further comprising:
   a database that stores state information that spans longer than a specified period of time.

6. The system of claim 1, further comprising:
   a connection established between the first cluster and the second cluster.

7. The system of claim 1, further comprising:
   a geographical configuration service that generates an alarm if the service level agreement is not identical between the first cluster and the second cluster.

8. The system of claim 1 wherein each of the first cluster and the second cluster is a network gateway deployment that receives requests from client applications that provide telecommunications services to one or more subscribers.

9. The system of claim 1 wherein the service level agreement is associated with at least one of: a service provider, an application and a network node.

10. A method for providing enforcement of service level agreements across geographical domains, said method comprising:
   maintaining a first domain cluster of computer nodes that process incoming requests;
   maintaining a second domain cluster of computer nodes that process incoming requests, said second domain cluster being geographically remote with respect to the first domain cluster of computer nodes, wherein each computer node in the first domain cluster and in the second domain cluster updates a local traffic count that is based on a number of said requests processed;
   wherein each of said first domain cluster and said second domain cluster further includes
      a stateless access layer cluster, comprising a plurality of access tier servers, that receives and forwards requests,
      a stateful network layer cluster, comprising a plurality of network tier servers, that receives the requests from the access tier, wherein the internal state information is synchronized between the network tiers of said first cluster and said second cluster, and
      a firewall separating the stateless access layer cluster from the stateful network layer cluster;
   designating a first local master node in the first domain cluster and a second local master node in the second domain cluster, wherein, upon expiration of a time interval, the first local master node updates a cluster-wide traffic count for the first domain cluster and the second local master hub node updates the cluster-wide traffic count for the second domain cluster;
   electing one of said first local master node and the second local master node to be a global master node that maintains budget state information synchronized between both the first domain cluster and the second domain cluster; and uniformly enforcing, by said global master node, the service level agreement across both the first domain cluster and the second domain cluster according to both the cluster-wide traffic count in the first domain cluster and the cluster-wide traffic count in the second domain cluster.

11. The method of claim 10 wherein the service level agreement is enforced across the clusters by a singleton budget service that is executing on the global master node running in one of the clusters.

12. The method of claim 10 wherein enforcing the service level agreement further includes:

transmitting service level agreement quota counters and service level agreement request limits between the local master node and the global master node.

13. The method of claim 10, further comprising:

persisting, into a database, the internal state information that spans longer than a specified length of time.

14. The method of claim 10 wherein each of said first cluster and said second cluster further includes:

a stateless access tier that receives and forwards requests; and a stateful network tier that receives the requests from the access tier, wherein the internal state information is replicated between the network tiers of said first cluster and said second cluster.

15. The method of claim 10, further comprising:

establishing a connection between the first cluster and the second cluster.

16. The method of claim 10, further comprising:

generating an alarm if the service level agreement is not identical between the first cluster and the second cluster.

17. The method of claim 10 wherein each of the first cluster and the second cluster is a network gateway deployment that receives requests from client applications that provide telecommunications services to one or more subscribers.

18. The method of claim 10 wherein the service level agreement is associated with at least one of: a service provider, an application and a network node.

19. A non-transitory computer-readable storage medium storing one or more sequences of instructions for providing geographical enforcement of service level agreements, which instructions, when executed by one or more processors, cause the one or more processors to carry out the steps of: maintaining a first domain cluster of computer nodes that process incoming requests; maintaining a second domain cluster of computer nodes that process incoming requests, said second domain cluster being geographically remote with respect to the first domain cluster of computer nodes, wherein each computer node in the first domain cluster and in the second domain cluster updates a local traffic count that is based on a number of said requests processed; wherein each of said first domain cluster and said second domain cluster further includes a stateless access layer cluster, comprising a plurality of access tier servers, that receives and forwards requests, a stateful network layer cluster, comprising a plurality of network tier servers, that receives the requests from the access tier, wherein the internal state information is synchronized between the network tiers of said first domain cluster and said second domain cluster, and a firewall separating the stateless access layer cluster from the stateful network layer cluster; designating a first local master node in the first domain cluster and a second local master node in the second domain cluster, wherein, upon expiration of a time interval, the first local master node updates a cluster-wide traffic count for the first domain cluster and the second local master hub node updates the cluster-wide traffic count for the second domain cluster; and; electing one of said first local master node and the second local master node to be a global master node that maintains budget state information synchronized between both the first domain cluster and the second domain cluster; and uniformly enforcing, by said global master node, the service level agreement across both the first domain cluster and the second domain cluster according to both the cluster-wide traffic count in the first domain cluster and the cluster-wide traffic count in the second domain cluster.

* * * * *